Dec. 1, 1936.  J. A. CARLSEN  2,062,554
HOG TONGUE GUARD
Filed March 9, 1936

Inventor
J.A.Carlsen
By Arthur H. Sturges.
Attorney

Patented Dec. 1, 1936

2,062,554

UNITED STATES PATENT OFFICE 2,062,554

HOG-TONGUE GUARD

John A. Carlsen, Omaha, Nebr.

Application March 9, 1936, Serial No. 67,756

5 Claims. (Cl. 17—1)

The present invention relates to the meat processing art and more particularly to hogs and has for an object to provide means for protecting the tongue of a hog while the carcass of the hog is undergoing certain later mentioned processing operations.

Another object of the invention is to provide a hog tongue guard which is economical in manufacture, may be readily applied to and removed from the mouth of a hog for the purpose of protecting the hog's tongue and for the primary purpose of insuring that the hog's tongue will have full food value after said processing.

With the foregoing and other objects in view the invention will be more fully described hereinafter and will be more particularly pointed out in the claims appended hereto.

In the drawing wherein like symbols refer to like or corresponding parts throughout the several views.

Figure 1:
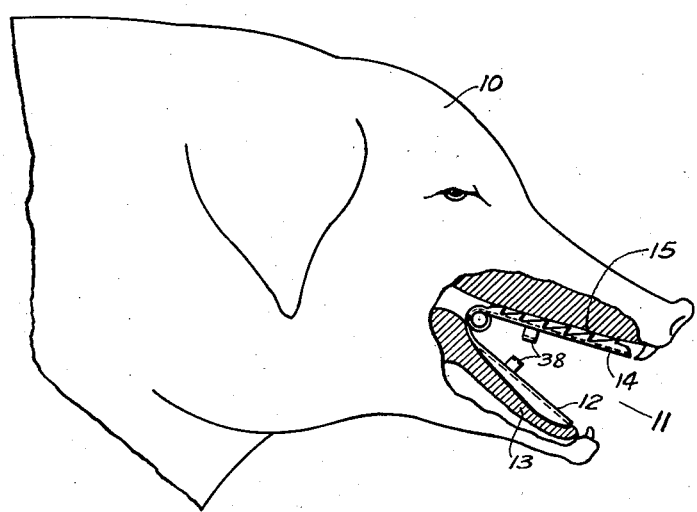
Figure 1 is a side elevation partly in section of the head of a hog and having an embodiment of the present invention applied to the mouth thereof in a position of use.

During the processing of a hog in a meat packing plant certain operations are performed during some of which the present invention is employed. A live hog is moved forwardly on a track, usually head down, and as the hog progresses along said track his throat is cut for killing and bleeding the hog, whereupon the hog carcass is passed through an elongated scalding vat containing water heated to about 140 degrees and then passed through a dehairing apparatus provided with revolving beaters which scrape the hog and remove the hair from the carcass.

As heretofore practiced in the art said revolving beaters have been instrumental in causing mutilation of the hog's tongue whereby its usefulness for food purposes is destroyed or materially lessened, and it is an object of the invention to provide a guard for said tongue which will function to protect it against mutilation by said dehairing beaters, whereby the tongue is subsequently useable for food particularly in a conventional manner, the device of the present invention being applied within the mouth of the hog carcass soon after the hog is dead and prior to the carcass being passed through the said dehairing apparatus. The invention also comprehends maintaining the jaws of the hog spread apart to permit singeing of the mouth by heating torches whereby shaving of the head of the hog by hand operations is obviated.

Referring now to the drawing for a more particular description, 10 indicates a hog having a mouth 11 within which the present invention is inserted prior to said scalding and dehairing operation.

The invention includes an elongated tongue plate 12 which preferably is of arcuate contour in cross section providing a longitudinally extending channel within which the tongue 13 of the hog is adapted to be partially received. An oppositely disposed roof plate 14 is adapted to engage the roof 15 of the hog's mouth. The plates 14 and 12 are hinged together at their ends and are substantially oppositely disposed. The roof plate 14 may be provided with a rolled tang 15' and the tongue plate 12 may be bifurcated to provide cooperating hinge members 16. A pin 17 extends through the members 15' and 16 for securing the said plates in hinged relation with respect to each other. If desired, the pin 17 may be provided at each of its ends with a roller 18.

Figure 2:
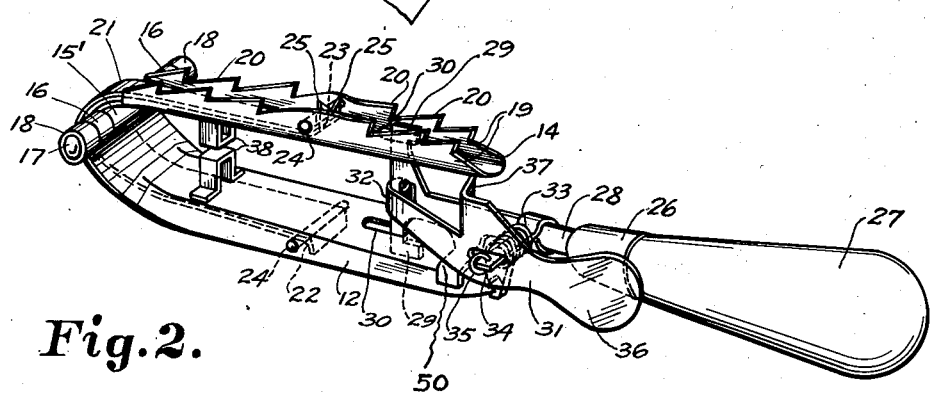
Figure 2 is a perspective view of said embodiment in a retracted condition, having applied thereto an instrument preferably used for maintaining the invention in said condition during an application thereof to a hog's mouth, said tool providing a removable handle when combined with the primary parts of the invention.

The roof plate 17 is preferably provided with outwardly turned longitudinal edges 19, said edges being serrated for providing teeth 20 adapted to engage the mouth-roof 15 of the hog. The teeth 20 may be dispensed with, if desired, more especially if assorted sizes of the invention are employed whereby a larger device is placed in a large hog mouth and a smaller device in a smaller mouth. In instances where the invention is of a uniform size the teeth 20 or similar serrations are preferably provided on the device for insuring that the invention will clamp to and remain within hog mouths of assorted sizes. A spring or resilient means 21 is provided for causing the free ends of the plates to be normally urged away from each other, said means 21 preferably being in the form of a flat steel spring extending over the ends of the plates as shown in Figure 2, the ends of the springs being secured to the plates by any suitable means such as bending said ends as at 22 and 23 and providing the transversely disposed pins 24 through said plates for engaging the spring thereto. If desired, the out-turned end 23 of the spring may be also provided with the teeth 25 for engaging the roof 15 of the hog. For utmost utility it is essential that a serrate or rough surface of some kind be provided on the roof plate for engaging the roof of a hog mouth, for otherwise the device may slip from said mouth except at times when the free ends of the plates engage against the natural teeth of the hog.

In order to facilitate a proper positioning of the invention within the mouth of the hog and to facilitate the same a tool or instrument 26 such as shown in Figure 2 is preferably employed and combined for conjoint cooperation with the foregoing minutely described parts. The tool is provided with a handle 27 secured to a shank 28, the outer end of which is T-shaped in plan, having oppositely disposed hooks 29 which are adapted to extend through the apertures 30 of the plates. In use, the roof-plate being normally moved away from the tongue-plate, a hook 29 of the tool is positioned through one of said apertures and engaged with a plate, the operator moving the plates towards each other and overcoming the urge of the spring 21 and engaging the hooks with the plates as shown in Figure 2. The plates then being retained in a contracted position with respect to each other by means of the pressure between the hooks 29 and the adjacent surfaces of the plates, the device may be inserted into the mouth of a hog. When the device has been properly positioned in said mouth the handle 27 is raised or swung toward the hog in parallelism with the latter, the foot 50 resting on the plate 12 and acting as a fulcrum point during said raising of the handle for causing the hook of the roof-plate to slide forwardly into the plane of the aperture of the roof-plate, whereby the latter is released and the two plates become urged outwardly with respect to each other at their free ends and engage the mouth of the hog as shown in Figure 1. At this time the handle 27 is moved toward the hog for causing the shank of the hook 29 to slide between the walls of the aperture 30 toward the pin 17 whereby the hook 29 becomes aligned with the aperture 30; whereupon the lower hook 39 may be readily disengaged, removed and released.

Means are provided for the tool 27 for preventing the free ends of the plates from springing away from each other prior to a proper positioning thereof within the hog mouth by the operator or prior to the time when the operator desires said movement of said ends, said means including a lever 31 having an end 32 pivotally secured to the head of the shank 28. The lever 31 is normally urged outwardly away from the shank 28 by means of a coiled spring 33 carried on an arm 34, said arm extending through the lever 31 and provided with a stop 35 at the outer end of said arm for preventing the lever from becoming completely freed from said arm. The lever 31 is provided with a thumb-plate 36 whereby the operator may readily compress the spring 33 for causing the wedge 37 carried by the lever to spread the plates apart sufficiently to cause the hooks 29 to frictionally engage their respective plates, the arrangement being such that at all times when the spring 33 is compressed sufficiently the wedge 37 prevents the hooks from moving into alignment with the apertures of the plates and insures that the plates are always held in the position shown in Figure 2 prior to being released within the hog's mouth.

Figure 3:
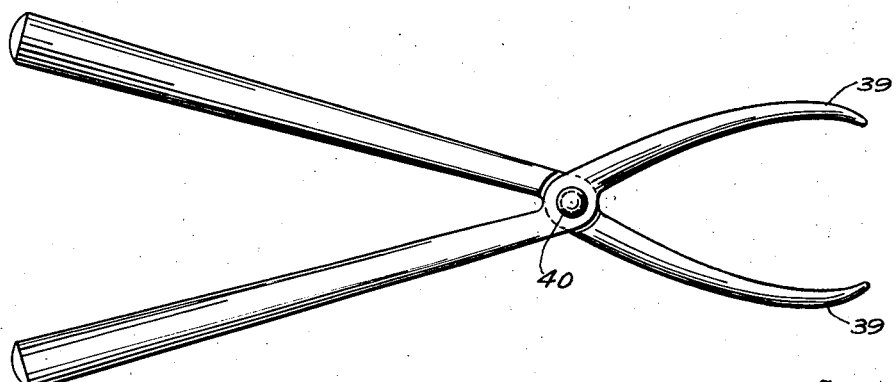
Figure 3 is a plan view of a tool which may be employed for removing said primary parts from the hog's mouth subsequent to use.

Means are provided for removing the plates from the hog's mouth after the latter has passed through the said dehairing beaters, said means preferably including an eye 38 carried by the tongue-plate and a similar eye positioned on the rooof-plate, said eyes being adapted to receive the ends 39 of the pair of tongs 40 shown in Figure 3. In use said ends 39 are placed through the eyes and the handles of said tongs moved towards each other for causing a corresponding movement of the ends 39 thereof for moving the plates towards each other and outwardly of the mouth of the hog, after which the parts of the invention are readily sterilized prior to reuse on a subsequently slaughtered hog, said parts being so arranged that sterilizing is facilitated.

What is claimed is:

1. A tongue guard for a hog comprising two oppositely disposed plates having adjacent ends pivotally connected together, and a spring extending over said ends, the ends of said spring being secured to respective plates for normally urging the free ends of the plates away from each other, said free ends being adapted to be moved toward each other against said urge of the spring for facilitating placement of the guard within the mouth of said hog, whereby upon a release of said free ends after said placement one of said plates engages the roof of said mouth and the other plate engages said tongue, said spring causing a union of said guard with said mouth for providing a protecting cover for said tongue.

2. A guard for a hog's tongue comprising a tongue protector plate, a mouth-roof engaging plate, said plates having adjacent ends pivotally connected together, and a flat spring extending over said pivotally connected ends and secured to said plates for normally urging the free ends of the plates away from each other.

3. A guard for a hog's tongue comprising two elongated oppositely disposed plates having ends pivotally connected together, and a spring for normally urging the free ends of said plates away from each other, said plates being provided with means adapted to cooperate with an instrument for detaining the plates in retracted relation with respect to each other against the urge of said spring to facilitate manipulation of the guard in the mouth of said hog.

4. A guard for a hog's tongue comprising an elongated plate having a longitudinally disposed channnel adapted to receive said tongue, and a roof-plate having teeth adapted to engage the roof of the mouth of said hog, said plates having ends pivotally connected together and a spring for normally urging the free ends of said plates away from each other.

5. A guard for a hog's tongue adapted to be inserted within the mouth of a hog comprising two oppositely disposed elongated plates having ends pivotally connected together, and a spring for normally urging the free ends of said plates away from each other to provide a gripping engagement with the roof of said mouth and tongue for protecting said tongue.

JOHN A. CARLSEN.